United States Patent
Sutardja et al.

(10) Patent No.: US 8,970,185 B1
(45) Date of Patent: Mar. 3, 2015

(54) METHOD FOR MAINTAINING HIGH EFFICIENCY POWER CONVERSION IN DC-DC SWITCHING REGULATORS OVER WIDE INPUT SUPPLY RANGE

(71) Applicant: Marvell International Ltd., Hamilton (BM)

(72) Inventors: Sehat Sutardja, Los Altos Hills, CA (US); Sofjan Goenawan, Cupertino, CA (US); Gareth Seng Thai Yeo, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/573,683

(22) Filed: Oct. 3, 2012

Related U.S. Application Data

(60) Provisional application No. 61/542,691, filed on Oct. 3, 2011.

(51) Int. Cl.
*G05F 1/00* (2006.01)

(52) U.S. Cl.
USPC .......................................................... 323/266

(58) Field of Classification Search
CPC .......... H02M 3/158; H02M 2001/007; H02M 2001/009
USPC ......... 323/222, 223, 224, 225, 266, 267, 271, 323/282, 284, 299; 363/59, 60; 307/109, 307/110; 327/536
See application file for complete search history.

(56) References Cited

U.S. PATENT DOCUMENTS

| | | | |
|---|---|---|---|
| 6,172,493 B1 * | 1/2001 | Grant | 323/288 |
| 6,201,717 B1 * | 3/2001 | Grant | 363/60 |
| 7,554,311 B2 * | 6/2009 | Pan | 323/285 |
| 7,656,024 B2 * | 2/2010 | Elbanhawy et al. | 257/707 |
| 2009/0315615 A1 * | 12/2009 | Likhterov | 327/536 |
| 2012/0025794 A1 * | 2/2012 | Inoue et al. | 323/271 |
| 2012/0249103 A1 * | 10/2012 | Latham et al. | 323/282 |

OTHER PUBLICATIONS

Gregoire, B.R. A compact Switched-Capacitor Regulated Charge Pump Power Supply, 2006, IEEE Journal of Solid-State Circuits, pp. 1944-1953.*

* cited by examiner

*Primary Examiner* — Gary L Laxton
*Assistant Examiner* — Alex Torres-Rivera

(57) ABSTRACT

A switching regulator includes a high-side driver configured to receive an input voltage, and a low-side driver configured to receive the input voltage. The high-side driver and the low-side driver are configured to provide an output voltage based on the input voltage. A charge pump module is configured to receive a supply voltage that varies between a first voltage level and a second voltage level greater than the first voltage level, generate the input voltage based on the supply voltage, and maintain the input voltage at the second voltage level independent of variations in the supply voltage.

23 Claims, 3 Drawing Sheets

METHOD FOR MAINTAINING HIGH EFFICIENCY POWER CONVERSION IN DC-DC SWITCHING REGULATORS OVER WIDE INPUT SUPPLY RANGE

CROSS-REFERENCE TO RELATED APPLICATIONS

This application claims the benefit of U.S. Provisional Application No. 61/542,691, filed on Oct. 3, 2011. The disclosure of the above application is incorporated herein by reference in its entirety.

FIELD

The present disclosure relates to a switching regulator, and more particularly to a system and method for maintaining a conduction channel of a power FET of a switching regulator.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a direct current to direct current (DC/DC) switching regulator 100 receives a DC input voltage (e.g., $PV_{IN}$) and outputs a DC output voltage (e.g., $V_{OUT}$). Various circuit components of the switching regulator 100 operate according to a supply voltage (e.g., $V_{DD}$), and the DC input voltage may correspond to the supply voltage, which may vary over a range.

The switching regulator 100 includes an output power stage including a high side driver 104 and a low side driver 108, an inductor 112, a bootstrap capacitor ($C_{BST}$) 116, and an output capacitor ($C_{OUT}$) 120. For example only, the drivers 104 and 108 include transistors such as NMOS power field effect transistors (FETs). A controller 124 such as a pulse width modulation (PWM) controller controls the drivers 104 and 108 via respective pre-driver buffer circuits 128 and 132. The input voltage (e.g., $V_{BST}$) may be provided to the switching regulator 100 via a rectifier diode 136. The inductor 112 and/or the bootstrap capacitor 116 may be located external to an integrated circuit that includes the drivers 104 and 108 and other components of the switching regulator 100, such as the controller 124. For example only, the bootstrap capacitor is between 10 and 50 nanoFarads.

SUMMARY

A switching regulator includes a high-side driver configured to receive an input voltage, and a low-side driver configured to receive the input voltage. The high-side driver and the low-side driver are configured to provide an output voltage based on the input voltage. A charge pump module is configured to receive a supply voltage that varies between a first voltage level and a second voltage level greater than the first voltage level, generate the input voltage based on the supply voltage, and maintain the input voltage at the second voltage level independent of variations in the supply voltage.

A method of operating a switching regulator includes providing an input voltage to a high-side driver and a low-side driver, providing an output voltage based on the input voltage using the high-side driver and the low-side driver, receiving a supply voltage that varies between a first voltage level and a second voltage level greater than the first voltage level, generating the input voltage based on the supply voltage, and maintaining the input voltage at the second voltage level independent of variations in the supply voltage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
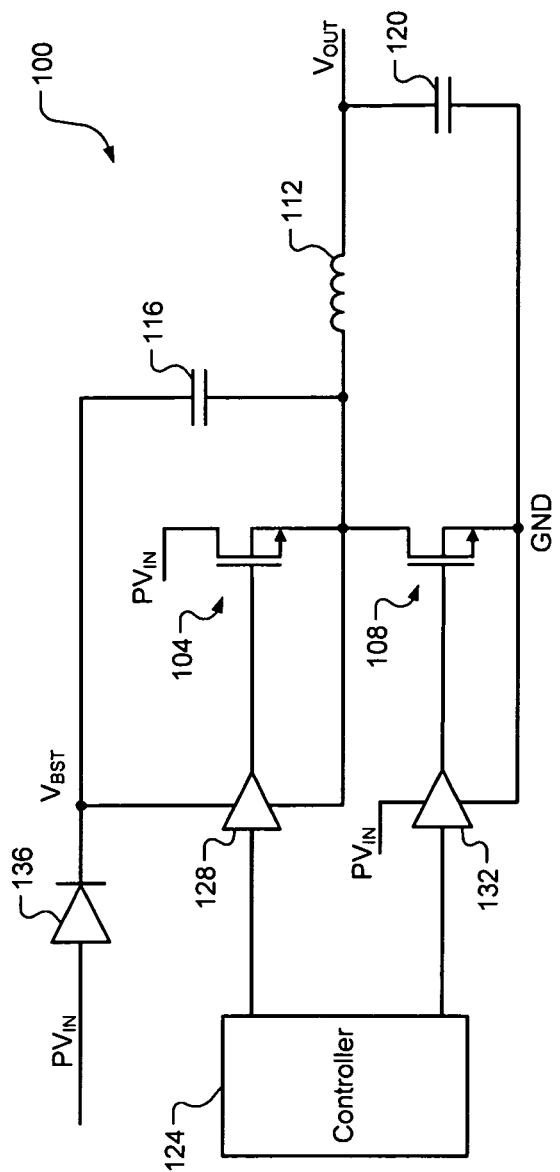
FIG. 1 illustrates a switching regulator according to the prior art.

Direct current to direct current (DC/DC) switching regulators generally include a high side driver and a low side driver. The high side driver and the low side driver include transistors such as NMOS power field effect transistors (FETs). An output conductance (e.g., GDS) of the power FETs is proportional to a difference between a threshold voltage (e.g., $V_{TH}$) and a gate-source voltage ($V_{GS}$) of the power FETs. A threshold voltage is generally in the range of 0.65V-0.8V. An inverse of the output conductance corresponds to an on resistance (e.g., $R_{DSon}$) of the power FETs.

Switching regulators typically operate according to a variable power input voltage (e.g., $PV_{IN}$), which corresponds to a variable supply voltage (e.g., $V_{DD}$). For example only, the supply voltage range may be approximately 2.3V to 5.5V. The power input voltage is input to the power FETs (e.g., to respective drains of the power FETs). When a power FET is ON, the gate-source voltage is approximately equal to $PV_{IN}$ (or, $V_{DD}$). Accordingly, as the supply voltage varies, the output conductance and the on resistance of the power FETs also vary. For example, the on resistance of each of the power FETs corresponds to: $R_{DSon}=1/GDS\sim1/(V_{GS}-V_{TH})$.

For example only, if the supply voltage is 2.3V and the threshold voltage is 0.8V, then the on resistance of the power FET is proportional to 1/(2.3−0.8), or 1/1.5. Conversely, if the supply voltage is 5.5V, then the on resistance is proportional to 1/(5.5-0.8), or 1/4.7. Accordingly, as the supply voltage varies from 2.3V to 5.5V, the on resistance varies by more than a factor of 3. More specifically, as the supply voltage decreases, the on resistance increases. As the on resistance increases, power loss of the switching regulator increases (i.e., efficiency of the switching regulator decreases).

A switching regulator according to the principles of the present disclosure includes a charge pump module. The charge pump module maintains a desired power input voltage regardless of variations in the supply voltage. For example, the charge pump module maintains the power input voltage at 5.5V regardless of whether the supply voltage decreases to 2.3V. Further, the charge pump module may include a capacitive charge pump circuit that uses the existing bootstrap capacitor of the switching regulator. The charge pump module can be used to boost the voltage of the bootstrap capacitor.

The boost voltage level (at $V_{BST}$) of the switching regulator can be set in accordance with the size of a high side driver and the size of a bootstrap capacitor. The effective input voltage to a pre-driver is reduced (from boost voltage level at $V_{BST}$) due to the charge sharing effect between the bootstrap capacitor and the gate capacitance of the driver. The voltage reduction at $V_{BST}$ is dependent upon the ratio of the gate capacitance of the driver to the capacitance of the bootstrap capacitor. If the capacitance of the bootstrap capacitor is significantly greater than the gate capacitance of the driver, then the charge sharing effect is negligible. For example, in typical applications, the bootstrap capacitor is an external capacitor in the range of 10 nF to 50 nF, while the gate capacitance of the driver is in a range of hundreds of pico Farads. In this circumstance, the reduction at $V_{BST}$ is relatively small (e.g., 10-50 mV). Conversely, the charge pump module accordingly to the present disclosure sets $V_{BST}$ independently of the supply voltage $V_{DD}$. The charge pump module can be set to boost $V_{BST}$ to a voltage level of, for example only, 7.5V instead of 5V, allowing the use of a smaller bootstrap capacitor, and reducing the charge sharing effect. The smaller size of the bootstrap capacitor allows the bootstrap capacitor to be integrated with other components of the switching regulator (e.g., the power FETs) on an integrated circuit (IC), eliminating the need for an extra pin on the IC for communication with an external bootstrap capacitor.

Figure 2:
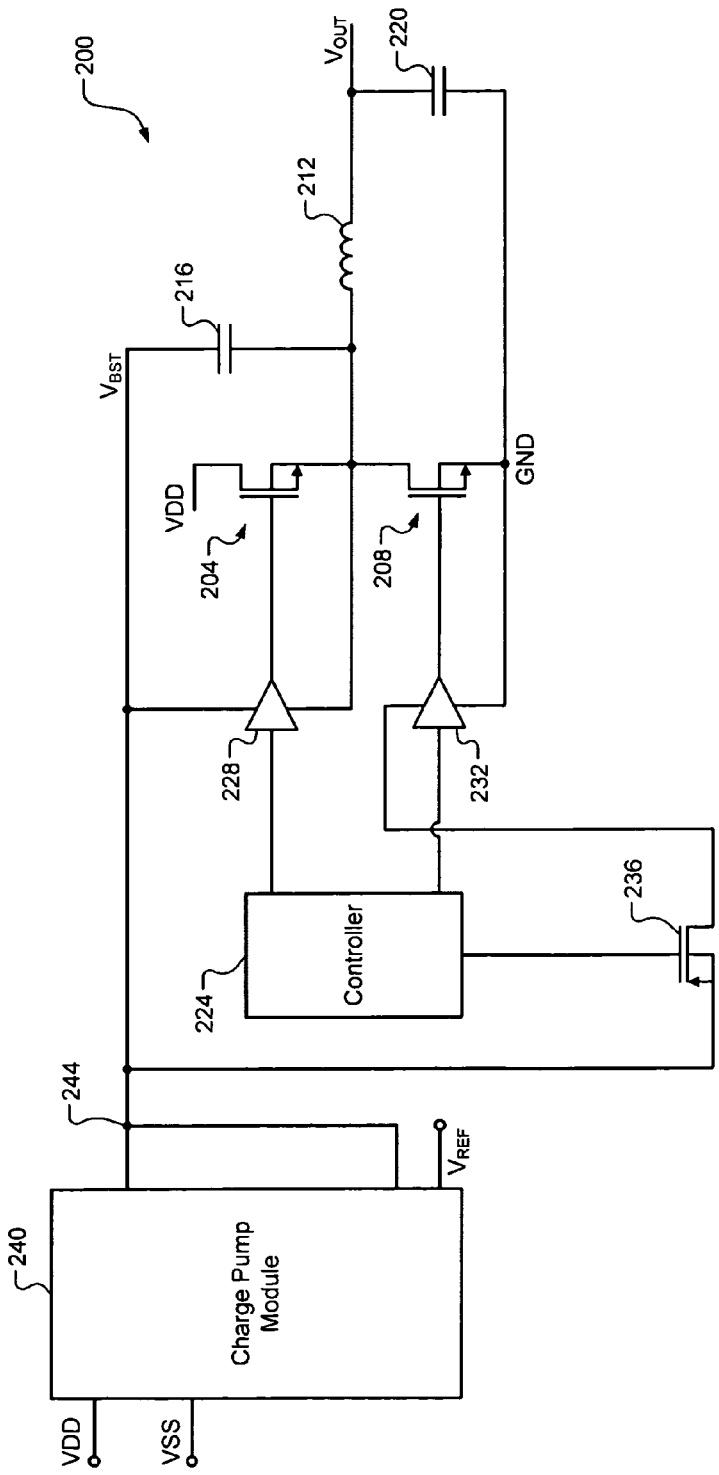
FIG. 2 illustrates a switching regulator including a charge pump module according to the principles of the present disclosure.

Referring now to FIG. 2, a direct current to direct current (DC/DC) switching regulator 200 receives supply voltages (e.g., $V_{dd}$ and $V_{ss}$) and outputs a DC output voltage (e.g., $V_{OUT}$). The supply voltages may vary over a range. Various circuit components of the switching regulator 200 operate according to a DC input voltage which may correspond to the supply voltages.

The switching regulator 200 includes an output power stage including a high side driver 204 and a low side driver 208, an inductor 212, a bootstrap capacitor ($C_{BST}$) 216, and an output capacitor ($C_{OUT}$) 220. For example only, the drivers 204 and 208 include transistors such as NMOS power field effect transistors (FETs). A controller 224 such as a pulse width modulation (PWM) controller controls the drivers 204 and 208 via respective pre-drivers 228 and 232. The input voltage is provided to the low side driver 208 via a switch (e.g., a PMOS transistor) 236. The controller 224 includes non-overlapping algorithms that control the pre-drivers 228 and 232. Furthermore, the controller 224 may implement any voltage level shifter required to control the gate drive of the switch 236.

A charge pump module 240 receives the supply voltages $V_{DD}$ and $V_{SS}$ and outputs the input voltage. In particular, the charge pump module 240 outputs the input voltage at a predetermined voltage (e.g., 5.5V) regardless of variation in the supply voltage $V_{DD}$. For example, the predetermined voltage 5.5V may correspond to a desired on resistance of the drivers 204 and 208 (i.e., to maintain a minimal on resistance of the drivers 204 and 208). Accordingly, if the supply voltage $V_{DD}$ decreases below 5.5V, the charge pump module 240 still outputs the input voltage at 5.5V.

The charge pump module 240 receives a feedback voltage 244 and a reference voltage $V_{REF}$. The feedback voltage 244 indicates the input voltage output from the charge pump module 240. Conversely, the reference voltage indicates a desired input voltage. The charge pump module 240 compares the feedback voltage 244 and the reference voltage $V_{REF}$ to maintain the input voltage based on the desired input voltage. Accordingly, the input voltage output from the charge pump module 240 can be increased or decreased according to the reference voltage.

The charge pump module 240 charges the bootstrap capacitor 216 using the input voltage. For example only, the input voltage provides a boost voltage $V_{BST}$ to the bootstrap capacitor 216. The bootstrap capacitor 216 retains a voltage charge provided by the boost voltage $V_{BST}$ and functions as a holding capacitor for the charge pump module 240. Accordingly, the charge pump module 240 does not require a separate holding capacitor. Further, the charge pump module 240 may charge the bootstrap capacitor 216 to a voltage greater than 5.5V. For example, the reference voltage can be increased to 7V, 8V, or another value greater than the 5.5V needed to minimize the on resistances of the drivers 204 and 208. Consequently, the size of the bootstrap capacitor 216 can be reduced. For example, the size of the bootstrap capacitor 216 can be decreased enough to allow the bootstrap capacitor 216 to be located on the same integrated circuit as the drivers 204 and 208 and other components of the switching regulator 200. Accordingly, a dedicated pin that would be needed otherwise for communicating with a bootstrap capacitor located external to the integrated circuit is eliminated.

Figure 3:
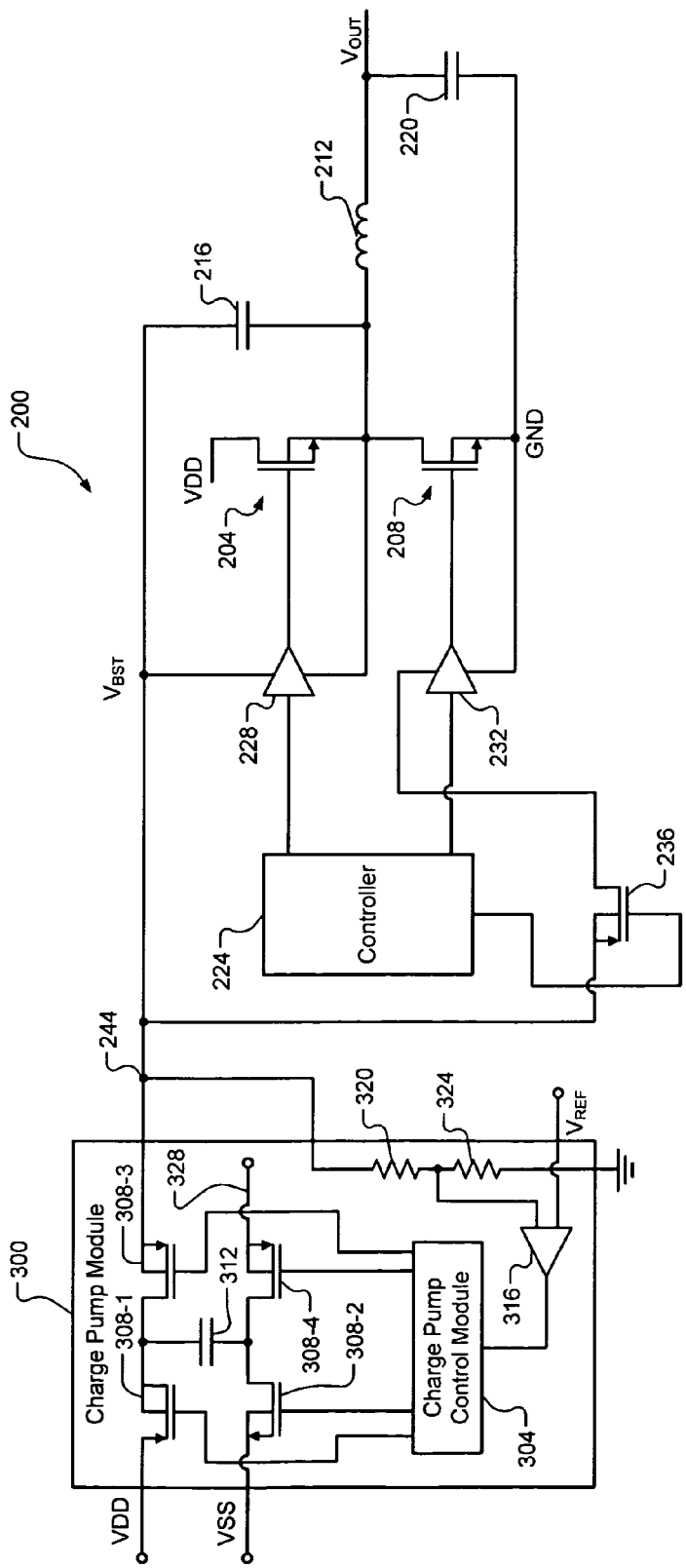
FIG. 3 illustrates an example charge pump module according to the principles of the present disclosure.

Referring now to FIG. 3, the switching regulator 200 is shown with an example charge pump module 300. The charge pump module 300 includes a charge pump control module 304, switches 308-1, 308-2, 308-3, and 308-4, referred to collectively as switches 308, capacitor 312, comparator 316, and resistors 320 and 324. The charge pump control module 304 controls the switches 308 to selectively charge the bootstrap capacitor 216 based on an output of the comparator 316. Furthermore, the charge pump module 300 may also implement any voltage level shifter required to control the gates of the switches 308-1 and 308-3. For example, the comparator 316 compares the feedback voltage 244 (or $V_{BST}$) and the reference voltage $V_{REF}$. The output of the comparator 316 indicates whether the charge pump control module 304 should control the switches 308 to charge the bootstrap capacitor 216. For example, if the feedback voltage 244 (or $V_{BST}$) is less than the reference voltage $V_{REF}$e, the charge pump control module 304 charges the bootstrap capacitor 216. The switch 308-4 may be connected to either $V_{DD}$ or $V_{OUT}$ at a node 328.

For example, in a first phase (e.g., a charge phase), the switches 308-1 and 308-2 are closed to charge the capacitor 312. When the switches 308-1 and 308-2 are closed, current flows between the supply voltages $V_{DD}$ and $V_{SS}$ to charge the capacitor 312. In a second phase (e.g., a pump phase), the switches 308-1 and 308-2 are opened and the switches 308-3 and 308-4 are closed to pump the charge to the bootstrap capacitor 216. In other words, the charge pump control module 304 selectively opens and closes the switches 308 to sequentially charge the capacitor 312 and the bootstrap capacitor 216 using the supply voltages.

When the input voltage $V_{BST}$ is sufficiently high (i.e., greater than or equal to the reference voltage $V_{REF}$), the switches 308-1 and 308-3 are closed to provide the supply voltage $V_{DD}$ as the input voltage. In other words, when the input voltage $V_{BST}$ is high, operation of the charge pump module 300 to charge the bootstrap capacitor 216 is not necessary. Conversely, when the input voltage $V_{BST}$ is less than the reference voltage $V_{REF}$, the charge pump control module 304 controls the switches 308 to charge the bootstrap capacitor 216. In this manner, the charge pump module 300 provides at least a desired input voltage (e.g., 5.5V) to the high side driver 204 and the low side driver 208.

The controller 224 controls the high side driver 204 and the low side driver 208 in a complementary and non-overlapping fashion. In other words, when the high side driver 204 is ON (i.e., closed), the low side driver 208 is OFF (i.e., open). Conversely, when the low side driver 208 is ON, the high side driver 204 is OFF.

When the low side driver 208 is ON, the charge pump module 300 is operated to provide the desired input voltage to the low side driver 208, and the controller 224 turns the switch 236ON (e.g., using a voltage level shifter) to provide the input voltage to the pre-driver 232. Accordingly, the low side driver 208 is driven by the input voltage, which is regulated at, for example, 5.5V, instead of the variable supply voltage $V_{DD}$. In other words, the low side driver 208 is driven according to the input voltage (e.g., $V_{BST}$), which is independent of the supply voltage $V_{DD}$.

Conversely, when the high side driver 204 is on, the charge stored in the bootstrap capacitor 216 maintains the input voltage at a high side of the high side driver 204. For example, the bootstrap capacitor 216 maintains the input voltage at 5.5V. The voltage at the high side of the high side driver 204 and a voltage at a low side of the high side driver 204 drives the high side driver 204. Accordingly, the high side driver 204 is driven according to the input voltage (e.g., $V_{BST}$), which is independent of the supply voltage $V_{DD}$.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; analog circuits; other suitable hardware components that provide the described functionality; or a combination of some or all of the above, such as in a system-on-chip. The term module may include memory (shared, dedicated, or group) that stores code executed by the processor. The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

What is claimed is:

1. A switching regulator, comprising:
 a high-side driver configured to receive an input voltage;
 a low-side driver configured to receive the input voltage via a switch disposed between the input voltage and the low-side driver, wherein the high-side driver and the low-side driver are configured to provide an output voltage based on the input voltage and the switch is configured to provide the input voltage to the low-side driver;
 a charge pump module configured to i) receive a supply voltage that varies between a first voltage level and a second voltage level greater than the first voltage level, ii) generate the input voltage based on the supply voltage, and iii) maintain the input voltage at least at the second voltage level independent of variations in the supply voltage; and
 a capacitor connected to an input of the high-side driver.

2. The switching regulator of claim 1, wherein the capacitor is configured to i) retain a charge corresponding to the input voltage, and ii) provide the input voltage to the input of the high-side driver.

3. The switching regulator of claim 2, wherein the charge pump module is configured to charge the capacitor.

4. The switching regulator of claim 2, wherein the capacitor is connected between the input of the high-side driver and an output of the low-side driver.

5. The switching regulator of claim 2, further comprising: an integrated circuit, wherein each of the high-side driver, the low-side driver, and the capacitor is incorporated into the integrated circuit.

6. The switching regulator of claim 1, wherein the charge pump module is configured to i) receive a feedback voltage and a reference voltage, wherein the feedback voltage is based on the input voltage, and ii) adjust the input voltage based on a comparison between the feedback voltage and the reference voltage.

7. The switching regulator of claim 1, wherein: the high-side driver includes a first power field effect transistor (FET) and the low-side driver includes a second power FET.

8. The switching regulator of claim 7, further comprising: a controller configured to alternately open and close the first power FET and the second power FET to provide the output voltage.

9. The switching regulator of claim 8, wherein the controller is configured to turn the switch on when the low-side driver is on.

10. The switching regulator of claim 1, wherein the charge pump module is configured to maintain the input voltage at least at the second voltage level based on a value of the capacitor connected to the input of the high-side driver and a capacitance of the high-side driver.

11. The switching regulator of claim 1, wherein the second voltage level is greater than a target supply voltage of the high-side driver.

12. The switching regulator of claim 1, wherein the charge pump module does not include a holding capacitor.

13. The switching regulator of claim 1, wherein the charge pump module is configured to selectively not boost the input voltage if the supply voltage is greater than or equal to a threshold.

14. The switching regulator of claim 1, wherein the charge pump module is configured to charge the capacitor to a third voltage level that is greater than the second voltage level.

15. The switching regulator of claim 14, wherein the first voltage level, the second voltage level, and the third voltage level are each positive values greater than zero.

16. A method of operating a switching regulator, the method comprising:
 providing an input voltage to a high-side driver;
 providing the input voltage to a low-side driver via a switch disposed between the input voltage and the low-side driver;
 providing an output voltage based on the input voltage using the high-side driver and the low-side driver;
 receiving a supply voltage that varies between a first voltage level and a second voltage level greater than the first voltage level;
 generating the input voltage based on the supply voltage;
 maintaining the input voltage at least at the second voltage level independent of variations in the supply voltage; and charging a capacitor connected to an input of the high-side driver.

17. The method of claim 16, further comprising:
using the capacitor, retaining a charge corresponding to the input voltage and providing the input voltage to the input of the high-side driver.

18. The method of claim 17, further comprising connecting the capacitor between the input of the high-side driver and an output of the low-side driver.

19. The method of claim 16, further comprising:
receiving a feedback voltage and a reference voltage, wherein the feedback voltage is based on the input voltage; and
adjusting the input voltage based on a comparison between the feedback voltage and the reference voltage.

20. The method of claim 16, further comprising maintaining the input voltage at least at the second voltage level based on a value of the capacitor connected to the input of the high-side driver and a capacitance of the high-side driver.

21. The method of claim 16, wherein the second voltage level is greater than a target supply voltage of the high-side driver.

22. The method of claim 16, further comprising:
charging the capacitor to a third voltage level that is greater than the second voltage level.

23. The method of claim 22, wherein the first voltage level, the second voltage level, and the third voltage level are each positive values greater than zero.

* * * * *